US008444780B2

(12) United States Patent
Edelman et al.

(10) Patent No.: US 8,444,780 B2
(45) Date of Patent: May 21, 2013

(54) HOT ROLLED THIN CAST STRIP PRODUCT AND METHOD FOR MAKING THE SAME

(75) Inventors: Daniel Geoffrey Edelman, Brownsburg, IN (US); Christopher Ronald Killmore, Wollongong (AU)

(73) Assignee: Nucor Corporation, Charlotte, NC (US)

( * ) Notice: Subject to any disclaimer, the term of this patent is extended or adjusted under 35 U.S.C. 154(b) by 386 days.

(21) Appl. No.: 12/708,638

(22) Filed: Feb. 19, 2010

(65) Prior Publication Data
US 2010/0215539 A1    Aug. 26, 2010

Related U.S. Application Data

(60) Provisional application No. 61/154,248, filed on Feb. 20, 2009.

(51) Int. Cl.
*C21D 8/02*    (2006.01)
*B22D 11/00*   (2006.01)

(52) U.S. Cl.
USPC .......................................... 148/541; 148/601

(58) Field of Classification Search
USPC .............. 148/221, 522, 538–548, 557, 579, 148/601–603, 639–664, 320, 332–336; 420/8, 420/99–102, 104–116, 120, 123, 124, 127, 420/129, 590
See application file for complete search history.

(56) References Cited

U.S. PATENT DOCUMENTS 5,901,777 A * 5/1999 Matsumura et al. .......... 164/475

FOREIGN PATENT DOCUMENTS

| AU | 7289791    | 10/1991 |
|----|------------|---------|
| BE | 874289     | 6/1979  |
| BE | 875003     | 7/1979  |
| JP | 03017244   | 1/1991  |
| JP | 09049065   | 2/1997  |
| JP | 2001098321 | 10/2001 |
| JP | 2004300452 | 10/2004 |
| JP | 2007211276 | 8/2007  |

\* cited by examiner

*Primary Examiner* — Scott Kastler
*Assistant Examiner* — Vanessa Luk
(74) *Attorney, Agent, or Firm* — Hahn Loeser & Parks, LLP

(57) ABSTRACT

A hot rolled steel strip made by the steps including assembling a twin roll caster, forming a casting pool of molten steel of such composition that the cast strip produced comprises by weight, greater than 0.25% and up to 1.1% carbon, between 0.40 and 2.0% manganese, between 0.05 and 0.50% silicon, less than 0.01% aluminum, counter rotating the casting rolls to solidify metal shells and forming a steel strip, hot rolling the steel strip such that mechanical properties at 10% and 35% reduction are within 10% for yield strength, tensile strength and total elongation, and coiling the hot rolled steel strip at a temperature between 550 and 750° C. to provide a majority of the microstructure comprising pearlite, along with bainite and acicular ferrite. The steel may have a free oxygen content between 5 and 50 ppm or between 25 and 45 ppm.

22 Claims, 5 Drawing Sheets

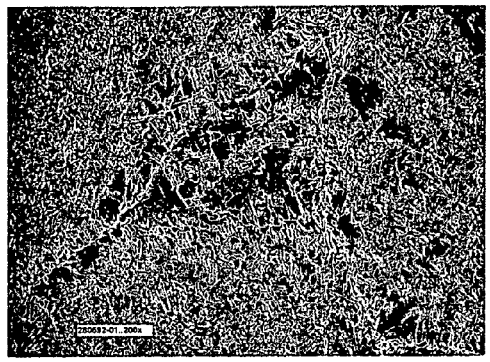
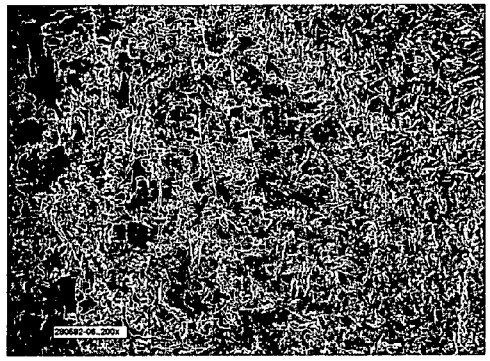
Fig. 3A Fig. 3B
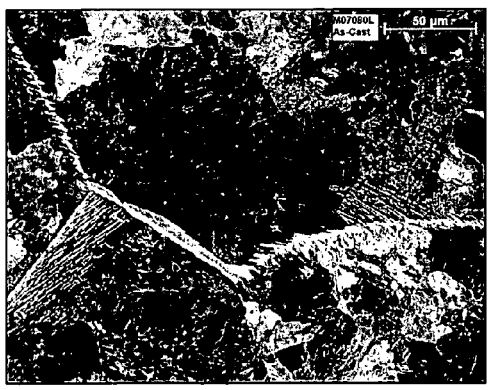
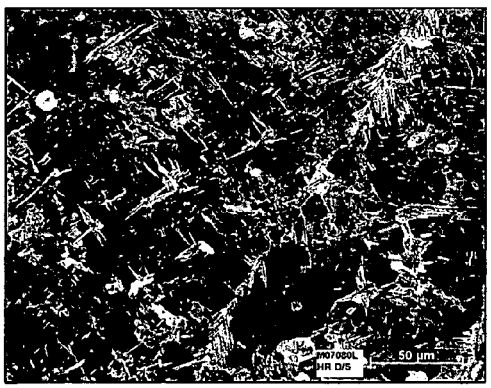
Fig. 4A Fig. 4B

HOT ROLLED THIN CAST STRIP PRODUCT AND METHOD FOR MAKING THE SAME

This application claims priority to and the benefit of U.S. Patent Application 61/154,248, filed on Feb. 20, 2009, which is incorporated herein by reference.

BACKGROUND AND SUMMARY

In a twin roll caster, molten metal is introduced between a pair of counter-rotated, internally cooled casting rolls so that metal shells solidify on the moving roll surfaces, and are brought together at the nip between them to produce a solidified strip product, delivered downwardly from the nip between the casting rolls. The term "nip" is used herein to refer to the general region at which the casting rolls are closest together. The molten metal is poured from a ladle through a metal delivery system comprising a tundish and a core nozzle located above the nip to form a casting pool of molten metal, supported on the casting surfaces of the rolls above the nip and extending along the length of the nip. This casting pool is usually confined between refractory side plates or dams held in sliding engagement with the end surfaces of the rolls so as to dam the two ends of the casting pool against outflow. The cast strip is typically directed to a hot rolling mill where the strip is hot reduced by 10% or more.

In certain steel applications, medium and high carbon pearlitic steels have been desired, such as for banding or strapping, and certain applications such as wall-ties for construction needing high strength and controlled toughness. Pearlite typically offers increased strength with reduced impact toughness. In the past, pearlitic microstructures were obtained by hot rolling and slow cooling medium and high carbon steel strip having thicknesses greater than about 3.0 millimeter. Obtaining thinner strip such as 1.0 to 1.5 millimeter required multiple rounds of cold rolling and annealing that coarsened if not eliminated the pearlite, reducing the strength of the steel.

A hot rolled steel strip is disclosed made by the steps comprising:
  assembling an internally cooled roll caster having laterally positioned casting rolls forming a nip between them, and forming a casting pool of molten steel supported on the casting rolls above the nip and confined adjacent the ends of the casting rolls by side dams, the molten steel of such composition that hot rolled thin cast strip produced has a composition comprising by weight, greater than 0.25% and up to 1.1% carbon, between 0.4 and 2.0% manganese, between 0.05 and 0.50% silicon, less than 0.01% aluminum,
  counter rotating the casting rolls to solidify metal shells on the casting rolls as the casting rolls move through the casting pool, and
  forming from the metal shells downwardly through the nip between the casting rolls a steel strip,
  hot rolling the steel strip such that mechanical properties at 10% and 35% reduction are within 10% for yield strength, tensile strength and total elongation; and
  coiling the hot rolled steel strip at a temperature between 550 and 750° C. to provide a majority of the microstructure comprising pearlite, along with bainite and acicular ferrite in the microstructure.

Alternatively, the step of hot rolling may be such that mechanical properties at 15% and 35% reduction are within 10% for yield strength, tensile strength and total elongation. In another alternative, the mechanical properties are within 10% throughout the range from 15% to 35% reduction for yield strength, tensile strength and total elongation. Alternatively, mechanical properties may be within 10% throughout the range from 10% to 35% reduction for yield strength, tensile strength and total elongation.

The molten steel cast may have a free oxygen content between 5 and 50 ppm or content between 25 and 45 ppm. The total oxygen content may be more than 20 and typically less than 100 ppm.

The molten steel may have a composition such that the manganese content of the composition of the hot rolled steel strip is between 0.9 and 1.3% by weight. Alternatively or in addition, the molten steel may have a composition such that the niobium content of the composition of the hot rolled steel strip is between about 0.01% and 0.2%. Alternatively or in addition, he composition of molten steel may be such that the composition of the hot rolled steel strip may have a composition comprising at least one element selected from the group consisting of molybdenum between about 0.05% and about 0.50%, vanadium between about 0.01% and about 0.20%, and a mixture thereof. The hot rolled steel strip may have a tensile strength of at least 800 MPa after hot rolling reductions of 15% and 35%.

The steps of making the hot rolled steel strip may include hot dip coating the hot rolled steel strip to provide a coating of zinc or a zinc alloy.

Alternatively, a hot rolled steel strip may be made by the steps comprising:
  assembling an internally cooled roll caster having laterally positioned casting rolls forming a nip between them, and forming a casting pool of molten steel supported on the casting rolls above the nip and confined adjacent the ends of the casting rolls by side dams, the molten steel of such composition that hot rolled thin cast strip produced has a composition comprising by weight, greater than 0.25% and up to 1.1% carbon, between 0.5 and 2.0% manganese, between 0.05 and 0.50% silicon, less than 0.01% aluminum,
  counter rotating the casting rolls to solidify metal shells on the casting rolls as the casting rolls move through the casting pool, and
  forming from the metal shells downwardly through the nip between the casting rolls a steel strip,
  hot rolling the steel strip such that mechanical properties at 10% and 35% reduction are within 10% for yield strength, tensile strength and total elongation; and
  coiling the hot rolled steel strip at a temperature between 200 and 550° C. to provide a majority of the microstructure comprising bainite, martensite, and acicular ferrite, and having less than 5% polygonal ferrite in the microstructure.

Alternatively, the step of hot rolling may be such that mechanical properties at 15% and 35% reduction are within 10% for yield strength, tensile strength and total elongation. In yet another alternative, the mechanical properties are within 10% throughout the range from 15% to 35% reduction for yield strength, tensile strength and total elongation. Alternatively, mechanical properties may be within 10% throughout the range from 10% to 35% reduction for yield strength, tensile strength and total elongation.

The molten steel cast may have a free oxygen content between 5 and 50 ppm or content between 25 and 45 ppm. The total oxygen content may be more than 20 and typically less than 100 ppm.

The molten steel may have a composition such that the manganese content of the composition of the hot rolled steel strip is between 0.9 and 1.3% by weight. Alternatively or in addition, the molten steel may have a composition such that the niobium content of the composition of the hot rolled steel strip is between about 0.01% and 0.2%. Alternatively or in addition, the composition of molten steel may be such that the composition of the hot rolled steel strip may have a composition comprising at least one element selected from the group consisting of molybdenum between about 0.05% and about 0.50%, vanadium between about 0.01% and about 0.20%, and a mixture thereof. The hot rolled steel strip may have a tensile strength of at least 1100 MPa after hot rolling reductions of 15% and 35%. Alternatively, the hot rolled steel strip may have a tensile strength between about 1100 and 1700 MPa after hot rolling reductions of 15% and 35%.

The steps of making the hot rolled steel strip may include hot dip coating the hot rolled steel strip to provide a coating of zinc or a zinc alloy.

BRIEF DESCRIPTION OF THE DRAWINGS

FIG. 3A is an optical micrograph of a comparative 0.19% carbon steel coiled at 600° C. and hot rolling reduction of 18%;

FIG. 3B is an optical micrograph of a comparative 0.19% carbon steel coiled at 600° C. and hot rolling reduction of 38%;

FIG. 4A is an optical micrograph of a 0.46% carbon steel showing a microstructure including grain boundary ferrite and fine lamellar pearlite;

FIG. 4B is an optical micrograph of a 0.46% carbon steel showing intragranular acicular ferrite;

DETAILED DESCRIPTION OF THE DRAWINGS

Figure 1:
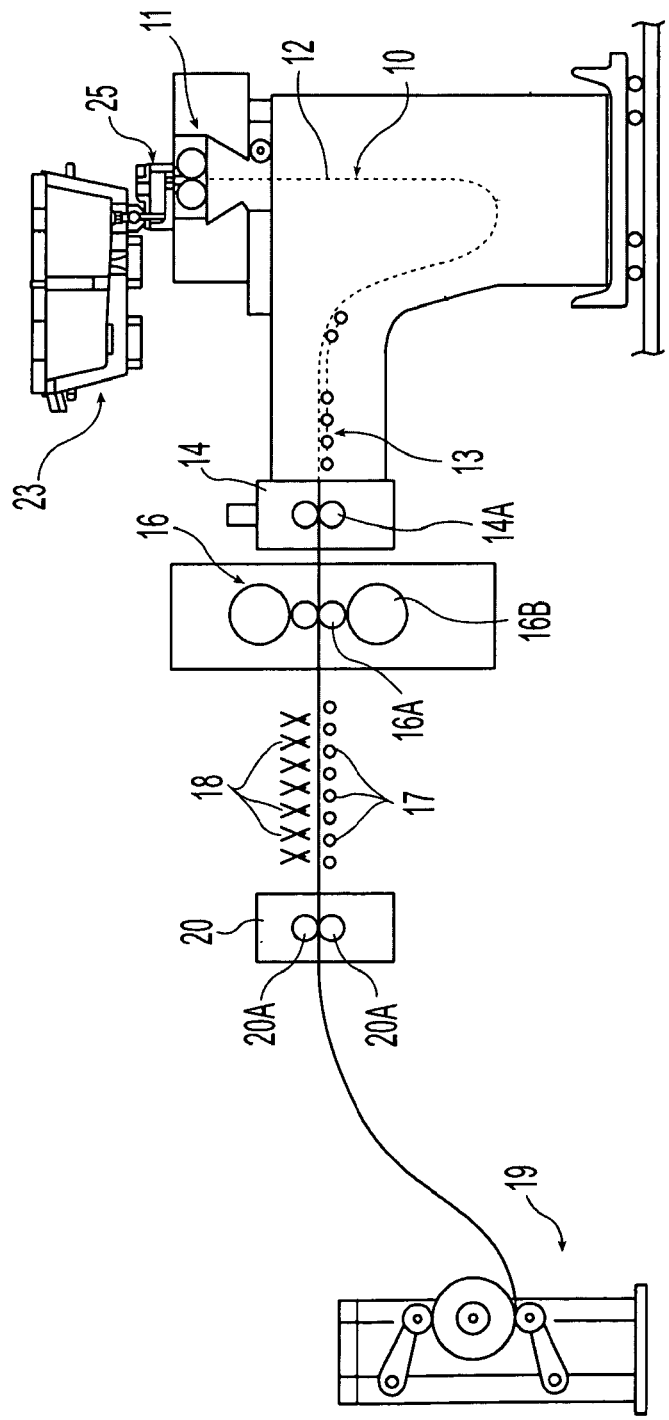
FIG. 1 illustrates a strip casting installation incorporating an in-line hot rolling mill and coiler.
Figure 2:
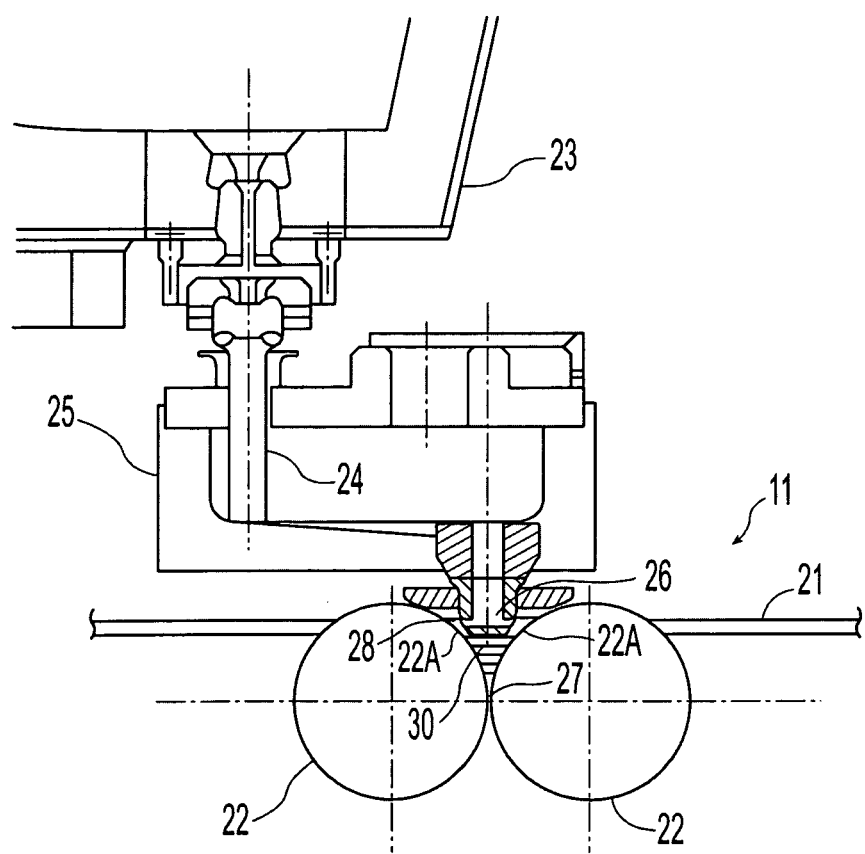
FIG. 2 illustrates details of the twin roll strip caster.

FIG. 1 illustrates successive parts of strip caster for continuously casting steel strip. FIGS. 1 and 2 illustrate a twin roll caster 11 that continuously produces a cast steel strip 12, which passes in a transit path 10 across a guide table 13 to a pinch roll stand 14 having pinch rolls 14A. Immediately after exiting the pinch roll stand 14, the strip passes into a hot rolling mill 16 having a pair of reduction rolls 16A and backing rolls 16B where the cast strip is hot rolled to reduce a desired thickness. The hot rolled strip passes onto a run-out table 17 where the strip may be cooled by convection and contact with water supplied via water jets 18 (or other suitable means) and by radiation. The rolled and cooled strip is then passes through a pinch roll stand 20 comprising a pair of pinch rolls 20A and then to a coiler 19. Final cooling of the cast strip takes place after coiling.

As shown in FIG. 2, twin roll caster 11 comprises a main machine frame 21, which supports a pair of laterally positioned casting rolls 22 having casting surfaces 22A. Molten metal is supplied during a casting operation from a ladle (not shown) to a tundish 23, through a refractory shroud 24 to a distributor or moveable tundish 25, and then from the distributor 25 through a metal delivery nozzle 26 between the casting rolls 22 above the nip 27. The molten metal delivered between the casting rolls 22 forms a casting pool 30 above the nip. The casting pool 30 is restrained at the ends of the casting rolls by a pair of side closure dams or plates 28, which are pushed against the ends of the casting rolls by a pair of thrusters (not shown) including hydraulic cylinder units (not shown) connected to the side plate holders. The upper surface of casting pool 30 (generally referred to as the "meniscus" level) usually rises above the lower end of the delivery nozzle so that the lower end of the delivery nozzle is immersed within the casting pool 30. Casting rolls 22 are internally water cooled so that shells solidify on the moving roller surfaces as they pass through the casting pool, and are brought together at the nip 27 between them to produce the cast strip 12, which is delivered downwardly from the nip between the casting rolls.

The twin roll caster may be of the kind that is illustrated and described in some detail in U.S. Pat. Nos. 5,184,668 and 5,277,243 or U.S. Pat. No. 5,488,988, or U.S. patent application Ser. No. 12/050,987. Reference may be made to those patents for appropriate construction details of a twin roll caster appropriate for use in an embodiment of the present invention.

The composition of the hot rolled steel strip has greater than 0.25% carbon and up to about 1.1% carbon to provide desired strength and microstructure having a thickness less than 3.0 mm, and may be less than 2.5 mm. Alternatively, the steel strip may be in the thickness range of 0.9 to 2.0 mm, and may be in the range of 1.0-1.5 mm. Carbon levels may be in the range of 0.30-0.60% in certain applications for steel strip. These high carbon steel strip products are achieved without multiple annealing and cold rolling required in past steel compositions to achieve the same properties, although for the present steel further processing may be desired for certain applications.

We have found that greater than 0.25% carbon steels exhibit a broader temperature range for the mushy zone of liquid in solid shells in casting the thin strip than is the case in plain low carbon steels. The broader range of mushy zone temperatures may require casting roll modifications for increasing the heat transfer as well as to the shape of the roll. The composition of the heats studied can be seen in TABLE 1.

TABLE 1

| Steel | C | Mn | Si | Nb | V | N (ppm) |
| --- | --- | --- | --- | --- | --- | --- |
| Base C—Mn | 0.02-0.05 | 0.7-0.9 | 0.15-0.30 | <0.003 | <0.003 | 35-90 |
| Comparative | 0.19 | 0.94 | 0.21 | <0.003 | <0.003 | 85 |
| K | 0.46 | 0.89 | 0.20 | <0.003 | <0.003 | 95 |

The composition of Steel K had a free oxygen content of 35.2 ppm, and was within the ranges of 5 to 50 ppm or of 25 and 45 ppm. The total oxygen was more than 20 ppm and typically less than 100 ppm. The comparative 0.19% carbon steel had a free oxygen content of 37.6 ppm.

The composition of the comparative 0.19% carbon steel is given in TABLE 1. The microstructures obtained in the 0.19% carbon comparison steel were complex and are shown for comparison in FIGS. 3A and 3B. The majority of the microstructure was acicular ferrite with a small proportion of grain boundary ferrite and some very fine pearlite. The ferrite volume fraction is higher in FIG. 3B, reflecting the higher degree of hot reduction.

By contrast, the tensile properties of the 0.46% carbon steel of the present hot rolled steel strip are presented in TABLE 2, with strength as cast (1.81 mm thick) and as rolled (1.26 mm thick). The tensile strengths recorded were over 800 MPa. Some examples of the microstructure obtained in the as-hot rolled condition are shown in FIGS. 4A and 4B. The samples of the 0.46% carbon steel shown in FIGS. 4A and 4B and TABLE 2 were processed without water cooling being applied in the accelerated cooling section of the run out table (i.e. the strip is air cooled).

TABLE 2

| Grade | Thickness (mm) | Yield Strength (MPa) | Tensile Strength (MPa) | % Elongation |
|---|---|---|---|---|
| 0.46% C | 1.81 | 596.9 | 835.5 | 7.3 |
| 0.46% C | 1.26 | 587.1 | 874.8 | 13.8 |

Figure 5:
FIG. 5 is an electron microscope thin foil image of 0.46% carbon steel showing fine lamellar structure.

The microstructures, shown in FIGS. 4A and 4B contained very little polygonal ferrite as in the comparative steel. The microstructure includes thin, discontinuous networks of grain boundary ferrite, often associated with very fine feathers of widmanstatten ferrite. The high level of hardenability imparted by this carbon content and a small difference between $A_3$ and $A_1$ temperatures, limited the growth of ferrite. The majority of the final microstructure consists of pearlite with a very fine lamellar spacing, identified using via TEM microscopy, shown in FIG. 5. Measurements of interlamellar spacing between the plates ranged from ~50-150 nm. In addition to the pearlite, intergranular acicular ferrite was present, showing a thin lenticular structure.

The hot rolled steel strip may be coiled at a temperature between about 550 and 750° C. to provide a majority of the microstructure comprising pearlite, along with bainite and acicular ferrite in the microstructure. Alternatively, the hot rolled steel strip may be coiled at a temperature between about 200 and 550° C. to provide a majority of the microstructure comprising bainite, martensite, and acicular ferrite, with less than 5% polygonal ferrite in the microstructure.

The hot rolled steel composition may comprise, by weight, greater than 0.25% and up to 1.1% carbon, between 0.4 and 2.0% manganese, between 0.05 and 0.50% silicon, less than 0.01% aluminum. The manganese content may be between 0.4 and 2.0% by weight, or between 0.4 and 0.7%, or between 0.6 and 0.9%, or between 0.7 and 1.0% by weight. Additionally, the molten steel cast may have a free oxygen content between 5 and 50 ppm or between 25 and 45 ppm. Total oxygen content may be more than 20 ppm and typically less than 100 ppm.

Figure 6:
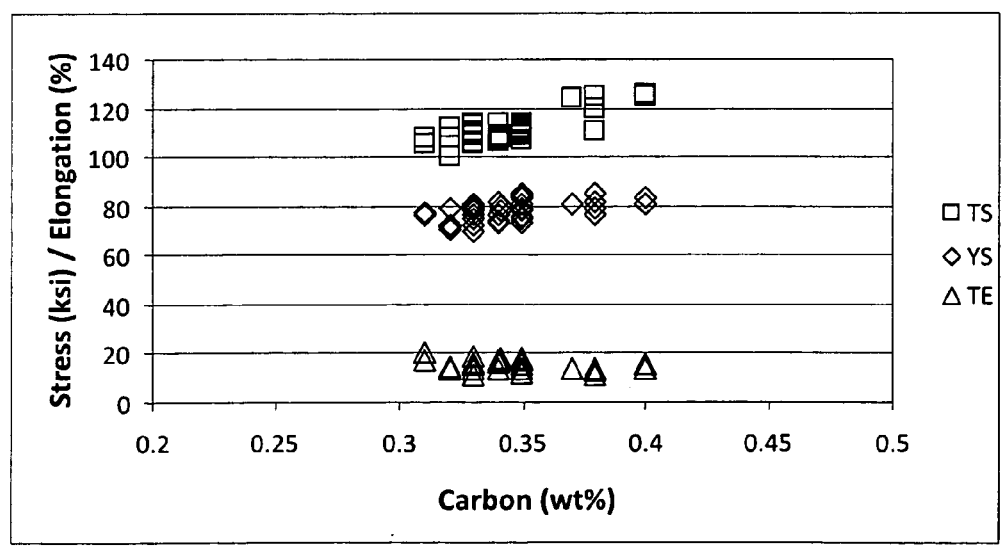
FIG. 6 is a graph showing the effect of amount of carbon on the tensile strength, yield strength, and elongation for test samples between 0.3 and 0.4% carbon.
Figure 7:
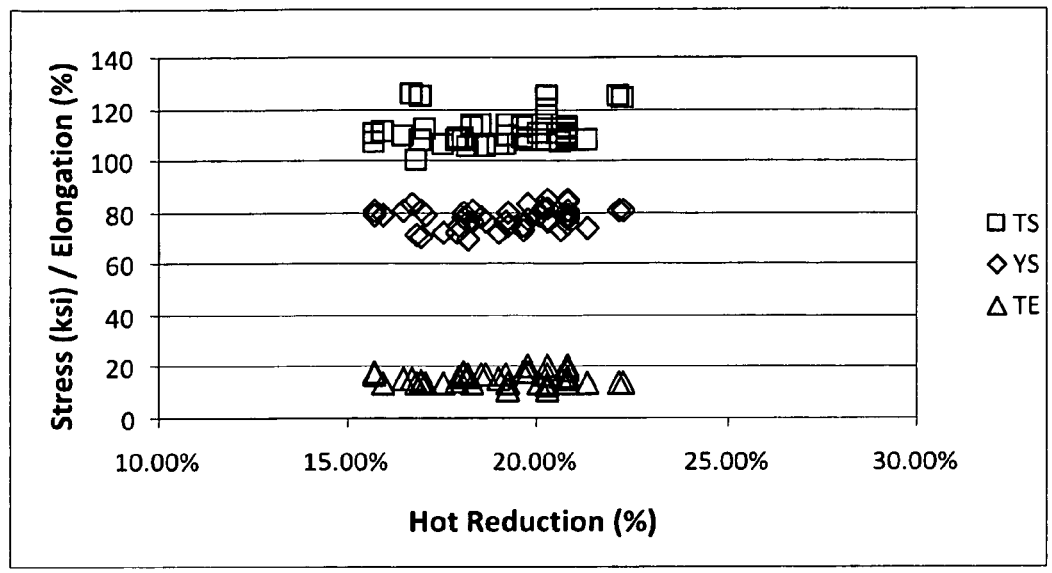
FIG. 7 is a graph showing the effect of hot rolling reduction on the tensile strength, yield strength, and elongation over reduction between about 15% and 23%.
Figure 8:
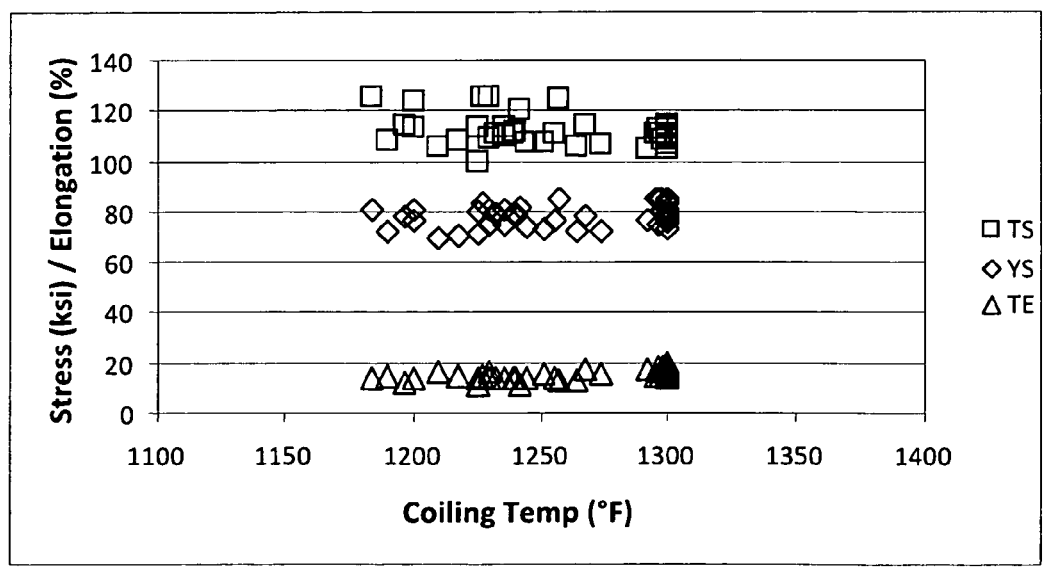
FIG. 8 is a graph showing the effect of coiling temperature on the tensile strength, yield strength, and elongation for coiling temperatures between about 1180 and 1300° F. (about 640 and 700° C.).

Samples of the present steel were prepared with coiling temperatures between about 640 and 710° C. and carbon amount between about 0.3% and 0.4%, shown in FIGS. 6 through 8. Shown in FIG. 6 are tensile strength, yield strength and total elongation over different levels of carbon amount between 0.3% and 0.4%.

The effect of hot reduction on yield strength, tensile strength, and total elongation in the present high carbon steels results in a steel properties where the tensile strength, yield strength and total elongation are relatively stable with different levels of hot reduction, as shown in FIG. 7. In previous such steel products, there is typically a decrease in yield and tensile strengths with increasing hot reduction. In contrast, the effect of different amounts of hot reduction on yield strength, tensile strength, and total elongation is significantly reduced in the present steel products. As shown in FIG. 7, the present high carbon steel is relatively stable with the degree of hot rolled reduction for reductions up to at least 25%. Alternatively, the present high carbon steel is relatively stable with the degree of hot rolled reduction for reductions up to at least 35%. The mechanical properties at 10% and 35% reduction are within 10% for yield strength, tensile strength and total elongation. Alternatively, the mechanical properties are within 10% throughout the range from 10% to 35% reduction for yield strength, tensile strength and total elongation. In yet another alternative, the mechanical properties at 15% and 35% reduction are within 10% for yield strength, tensile strength and total elongation. Alternatively, the mechanical properties are within 10% throughout the range from 15% to 35% reduction for yield strength, tensile strength and total elongation.

As shown in FIG. 8, the tensile strength, yield strength and total elongation are relatively stable with different coiling temperatures between about 640 and 710° C. (1180 and 1300° F.). Alternatively, the present high carbon steel is relatively stable with the coiling temperature between about 550 and 750° C.

The molten steel may have a composition such that the composition of the hot rolled steel composition comprises a niobium content between about 0.01% and 0.2%. The composition may alternatively or in addition comprise at least one element selected from the group consisting of molybdenum between about 0.05% and about 0.50%, vanadium between about 0.01% and about 0.20%, and a mixture thereof.

While the invention has been illustrated and described in detail in the foregoing drawings and description, the same is to be considered as illustrative and not restrictive in character, it being understood that only illustrative embodiments thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A method of making hot rolled steel strip, the steps comprising:

assembling an internally cooled roll caster having laterally positioned casting rolls forming a nip between them, and forming a casting pool of molten steel supported on the casting rolls above the nip and confined adjacent the ends of the casting rolls by side dams, the molten steel of such composition that hot rolled thin cast strip produced has a composition comprising by weight, greater than 0.25% and up to 1.1% carbon, between 0.5 and 2.0% manganese, between 0.05 and 0.50% silicon, less than 0.01% aluminum, counter rotating the casting rolls to solidify metal shells on the casting rolls as the casting rolls move through the casting pool, and forming from the metal shells downwardly through the nip between the casting rolls a steel strip, hot rolling the steel strip such that mechanical properties at 10% and 35% reduction are within 10% for yield strength, tensile strength and total elongation; and coiling the hot rolled steel strip at a temperature between 550 and 750° C. to provide a majority of the microstructure comprising pearlite, along with bainite and acicular ferrite in the microstructure.

2. The method of making hot rolled steel strip as claimed in claim 1, the step of hot rolling the steel strip such that mechanical properties at 15% and 35% reduction are within 10% for yield strength, tensile strength and total elongation.

3. The method of making hot rolled steel strip as claimed in claim 1, the molten steel having a free oxygen content between 5 and 50 ppm.

4. The method of making hot rolled steel strip as claimed in claim 1, the molten steel having a free oxygen content between 25 and 45 ppm.

5. The method of making hot rolled steel strip as claimed in claim 1 where the steel strip has a thickness of less than 2.5 mm.

6. The method of making hot rolled steel strip as claimed in claim 1, the molten steel having a composition such that the manganese content of the composition of the hot rolled steel strip is between 0.6 and 1.0% by weight.

7. The method of making hot rolled steel strip as claimed in claim 1, the molten steel having a composition such that a niobium content of the composition of the hot rolled steel strip is between about 0.01% and 0.2%.

8. The method of making hot rolled steel strip as claimed in claim 1, the composition further comprising at least one element selected from the group consisting of molybdenum between about 0.05% and about 0.50%, vanadium between about 0.01% and about 0.20%, and a mixture thereof.

9. The method of making hot rolled steel strip as claimed in claim 1 further comprising the step of:
hot dip coating the hot rolled steel strip to provide a coating of zinc or a zinc alloy.

10. The method of making hot rolled steel strip as claimed in claim 1 having a tensile strength of at least 800 MPa after hot rolling reductions of 15% and 35%.

11. A method of making hot rolled steel strip, the steps comprising:
assembling an internally cooled roll caster having laterally positioned casting rolls forming a nip between them, and forming a casting pool of molten steel supported on the casting rolls above the nip and confined adjacent the ends of the casting rolls by side dams, the molten steel of such composition that hot rolled thin cast strip produced has a composition comprising by weight, greater than 0.25% and up to 1.1% carbon, between 0.5 and 2.0% manganese, between 0.05 and 0.50% silicon, less than 0.01% aluminum,
counter rotating the casting rolls to solidify metal shells on the casting rolls as the casting rolls move through the casting pool, and
forming from the metal shells downwardly through the nip between the casting rolls a steel strip,
hot rolling the steel strip such that mechanical properties at 10% and 35% reduction are within 10% for yield strength, tensile strength and total elongation; and
coiling the hot rolled steel strip at a temperature between 200 and 550° C. to provide a majority of the microstructure comprising bainite, martensite, and acicular ferrite, and having less than 5% polygonal ferrite by volume in the microstructure.

12. The method of making hot rolled steel strip as claimed in claim 11, the hot rolled steel strip such that mechanical properties at 15% and 35% reduction are within 10% for yield strength, tensile strength and total elongation.

13. The method of making hot rolled steel strip as claimed in claim 11, the molten steel having a free oxygen content between 5 and 50 ppm.

14. The method of making hot rolled steel strip as claimed in claim 11, the molten steel having a free oxygen content between 25 and 45 ppm.

15. The method of making hot rolled steel strip as claimed in claim 11 where the steel strip has a thickness of less than 2.5 mm.

16. The method of making hot rolled steel strip as claimed in claim 11, the molten steel having a composition such that the manganese content of the composition of the hot rolled steel strip is between 0.6 and 1.0% by weight.

17. The method of making hot rolled steel strip as claimed in claim 11, the molten steel having a composition such that a niobium content of the composition of the hot rolled steel strip is between about 0.01% and 0.2%.

18. The method of making hot rolled steel strip as claimed in claim 11, the composition further comprising at least one element selected from the group consisting of molybdenum between about 0.05% and about 0.50%, vanadium between about 0.01% and about 0.20%, and a mixture thereof.

19. The method of making hot rolled steel strip as claimed in claim 11 made by the steps further comprising the step of:
hot dip coating the hot rolled steel strip to provide a coating of zinc or a zinc alloy.

20. The method of making hot rolled steel strip as claimed in claim 11 having a tensile strength of at least 800 MPa after hot rolling reductions of 15% and 35%.

21. The method of making hot rolled steel strip as claimed in claim 11 having a tensile strength between about 1100 and 1400 MPa after hot rolling reductions of 15% and 35%.

22. The method of making hot rolled steel strip as claimed in claim 11 having a tensile strength between about 1400 and 1700 MPa after hot rolling reductions of 15% and 35%.

* * * * *